US009274005B2

(12) United States Patent
Samarao et al.

(10) Patent No.: US 9,274,005 B2
(45) Date of Patent: Mar. 1, 2016

(54) DEVICE AND METHOD FOR INCREASING INFRARED ABSORPTION IN MEMS BOLOMETERS

(71) Applicant: Robert Bosch GmbH, Stuttgart (DE)

(72) Inventors: Ashwin K. Samarao, Mountain View, CA (US); Gary O'Brien, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 13/970,786

(22) Filed: Aug. 20, 2013

(65) Prior Publication Data
US 2014/0054462 A1 Feb. 27, 2014

Related U.S. Application Data

(60) Provisional application No. 61/692,406, filed on Aug. 23, 2012.

(51) Int. Cl.
*G01J 5/20* (2006.01)
*G01J 5/08* (2006.01)
(52) U.S. Cl.
CPC . *G01J 5/20* (2013.01); *G01J 5/0853* (2013.01)
(58) Field of Classification Search
CPC .................. G01J 5/08; G01J 5/20; G01J 5/02

USPC ....................................................... 250/338.4
See application file for complete search history.

(56) References Cited

U.S. PATENT DOCUMENTS

| 5,602,393 | A  | * | 2/1997  | Gerard       | 250/338.4 |
| 5,825,029 | A  | * | 10/1998 | Agnese et al.| 250/338.1 |
| 7,868,298 | B2 |   | 1/2011  | Feyh         |           |
| 8,546,757 | B2 | * | 10/2013 | Hanson       | 250/338.4 |
| 2007/0170359 | A1 | * | 7/2007 | Syllaios et al. | 250/338.1 |
| 2011/0266445 | A1 |   | 11/2011 | Beratan     |           |
| 2011/0267322 | A1 | * | 11/2011 | Cole et al. | 345/205   |

OTHER PUBLICATIONS

Invitation to Pay Additional Fees and Partial International Search Report corresponding to PCT Application No. PCT/US2013/056226, mailed Nov. 5, 2013 (6 pages).

* cited by examiner

*Primary Examiner* — Marcus Taningco
(74) *Attorney, Agent, or Firm* — Maginot Moore & Beck LLP

(57) ABSTRACT

A semiconductor sensor includes a substrate and an absorber. The substrate includes at least one reflective component. The absorber is spaced apart from the at least one reflective component by a distance. The absorber defines a plurality of openings each having a maximum width that is less than or equal to the distance.

20 Claims, 11 Drawing Sheets

DEVICE AND METHOD FOR INCREASING INFRARED ABSORPTION IN MEMS BOLOMETERS

This application claims the benefit of U.S. Provisional Application No. 61/692,406, filed on Aug. 23, 2012, the entire contents of which are herein incorporated by reference.

FIELD

This disclosure relates to MEMS (Microelectro-mechanical) bolometers and more particularly to structuring a MEMS bolometer to increase radiation absorption in a desired range of wavelengths.

BACKGROUND

A bolometer is a type of thermal sensor that senses a change in temperature of an object based on a change in electromagnetic radiation emitted by the object. Typically, bolometers are configured to detect radiation in the infrared range, which has a wavelength of approximately three to twelve micrometers (3-12 µm).

Most bolometers include an absorber for detecting/receiving the radiation emitted by the object. Of the various materials available for forming the absorber, metals are not typically considered suitable. This is because in general metals are very good at shielding/reflecting infrared radiations. It was discovered, however, that at ultra-thin layers, for example approximately ten nanometers (~10 nm), metals act as good absorbers for infrared radiation. Upon absorbing radiation, the ultra-thin layer of metal heats-up and exhibits a change in electrical resistance, which is monitored by external circuitry to sense a change in temperature of an object.

When using an absorber formed from an imperforate ultra-thin layer of metal, the bolometer exhibits a relatively narrow bandwidth and a moderate capacity for absorbing incident radiation. The bandwidth of the bolometer refers to the range of wavelengths that are detectable by the absorber. The capacity for absorption of the bolometer refers to the percentage of incident radiation that is absorbed by the absorber. Ideally, a bolometer absorbs 100% of the incident radiation across a wide bandwidth. Known bolometers, however, do not achieve these ideal specifications.

Accordingly, a need exists to further improve the structure of bolometers to increase the bandwidth and the capacity for absorbing incident radiation, thereby resulting in a more efficient bolometer.

SUMMARY

According to one embodiment of the disclosure, a semiconductor sensor includes a substrate and an absorber. The substrate includes at least one reflective component. The absorber is spaced apart from the at least one reflective component by a distance. The absorber defines a plurality of openings each having a maximum width that is less than or equal to the distance.

According to another embodiment of the disclosure, a method of forming a semiconductor sensor includes spacing an absorber apart from at least one reflective component by a distance, and forming a plurality of openings in the absorber. Each opening of the plurality of openings defines a maximum width that is less than the distance. The distance is based on a wavelength of radiation, and the distance is less than the wavelength of radiation. Accordingly, the openings are sub-wavelength openings.

BRIEF DESCRIPTION OF THE DRAWINGS

The above-described features and advantages, as well as others, should become more readily apparent to those of ordinary skill in the art by reference to the following detailed description and the accompanying figures in which.

DESCRIPTION

Figure 1:
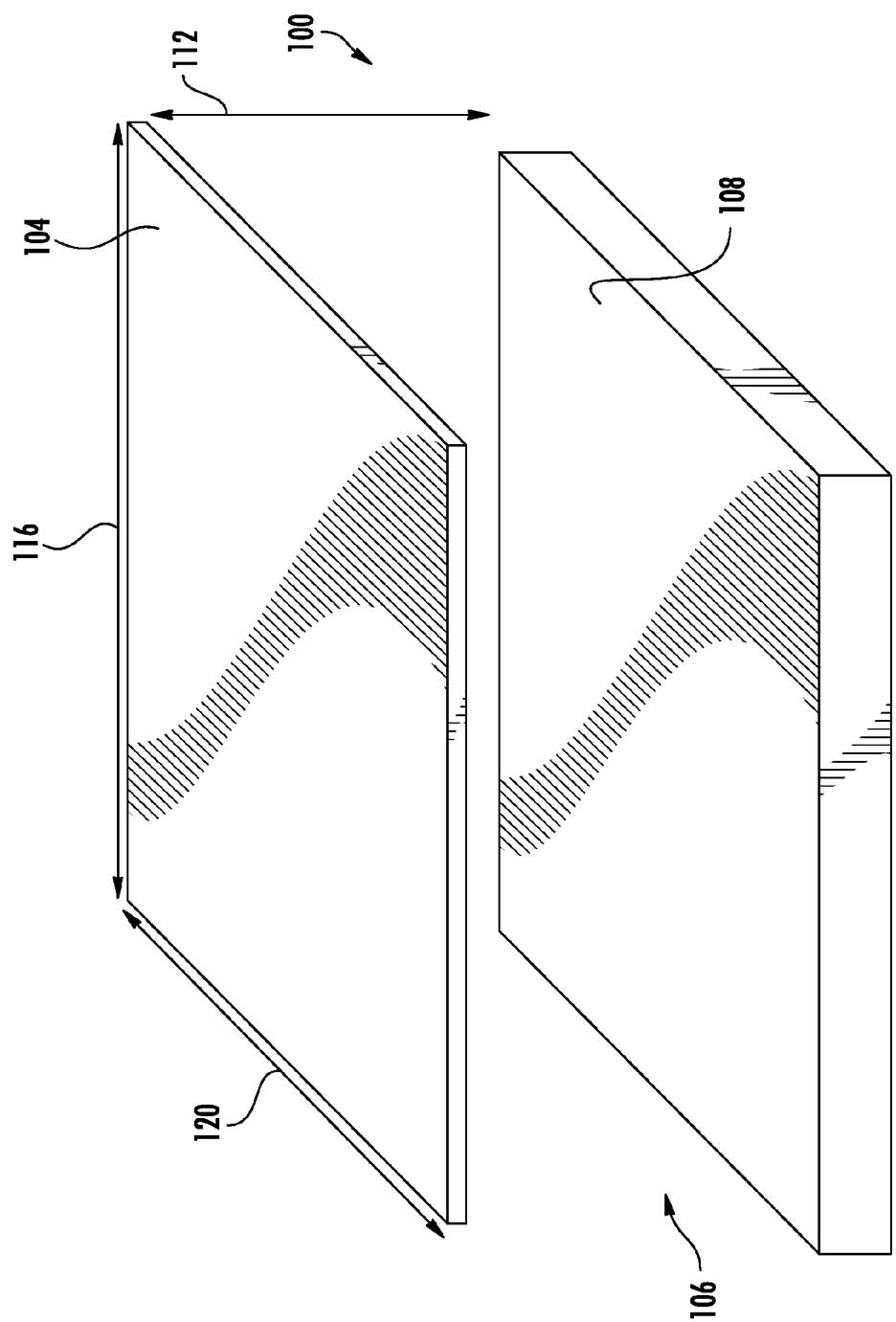
FIG. 1 is a perspective view of a prior art semiconductor sensor including an absorber spaced apart from a reflector.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a prior art MEMS bolometer 100 includes an absorber 104 and substrate 106 including a reflector 108. The absorber 104 is typically an ultra-thin layer/sheet of platinum having a thickness of approximately ten nanometers (10 nm). In the embodiment, of FIG. 1, the absorber 104 defines a length 116 and a width 120 of approximately fifty micrometers (50 µm). The absorber 104 is spaced apart from the reflector layer 108 by a distance 112, which is approximately three micrometers (3 µm). FIG. 1 is not drawn to scale.

The reflector 108 is a reflective component that is spaced apart from the absorber layer 104. The reflector 108 is typically formed from either platinum or aluminum. As compared to the absorber 104, the reflector 108 is comparatively thick having a thickness of approximately five hundred nanometers (500 nm). The reflector 108 is approximately the same size in area as the absorber 104.

In use, the bolometer 100 is exposed to radiation, typically in the infrared region. The radiation is imparted on the reflector 108. At least a portion of the incident radiation is reflected by the reflector 108 onto the absorber 104. The absorber 104 undergoes a change in response to the radiation that is reflected thereon. The change in the absorber 104 is detected/monitored by external circuitry (not shown) to determine the temperature of an object (not shown) from which the radiation originated.

Figure 2:
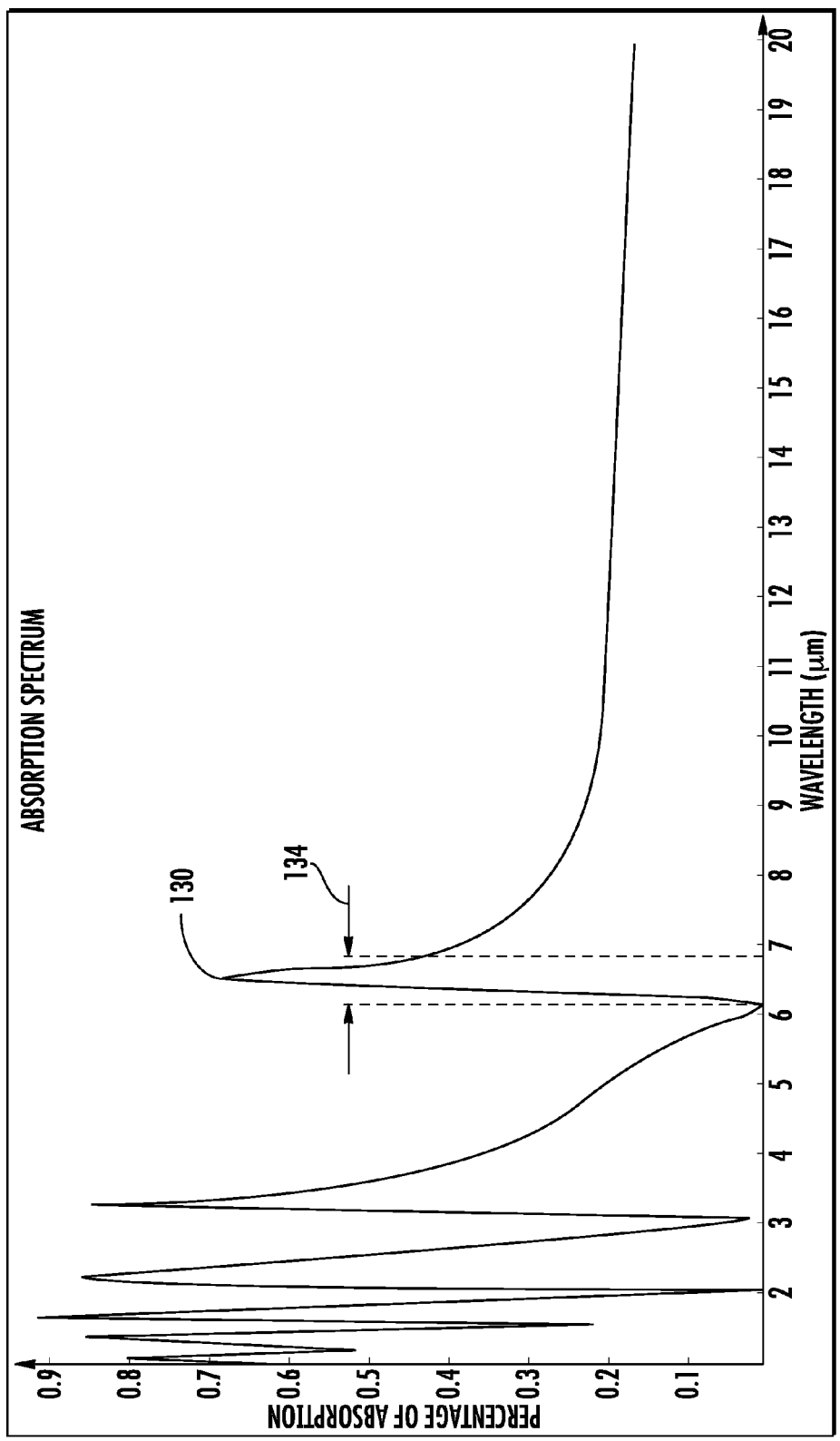
FIG. 2 is a graph showing an absorption spectrum of the semiconductor sensor of FIG. 1.

FIG. 2 illustrates an absorption spectrum of the bolometer 100 in the infrared region of radiation. Considering a range of wavelengths extending from approximately eight micrometers (8 µm) to fourteen micrometers (14 µm), the bolometer 100 absorbs approximately 29% of the radiation at eight micrometers and approximately 17% of the radiation at fourteen micrometers. The absorption percentage declines as the wavelength increases from eight micrometers (8 µm) to fourteen micrometers (14 µm). The bolometer 100 exhibits a maximum absorption percentage 130 of approximately 70% for radiation of approximately 6.5 micrometers (6.5 µm). Further, the bolometer 100 exhibits a cavity resonance in the wavelength zone 134 that, as described below, is relatively narrow.

In the novel and nonobvious bolometer 200 (FIG. 3) described herein, the structure of the bolometer is modified to achieve wide-band radiation absorption in the infrared range. In particular, the bolometer 200 is particularly suited for absorbing infrared radiation in a wavelength range of eight micrometers to fourteen micrometers.

Figure 3:
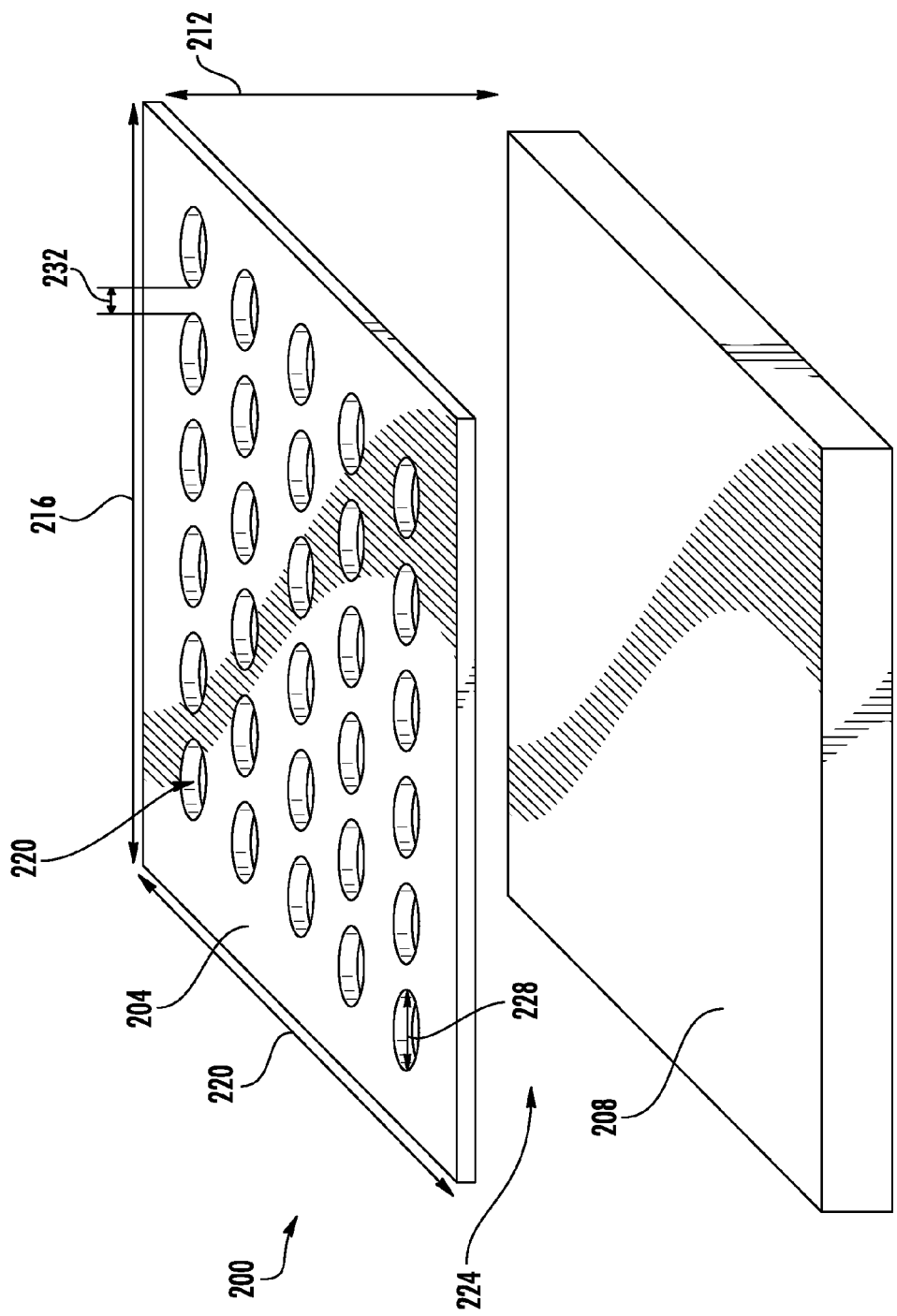
FIG. 3 is a perspective view of a semiconductor sensor, as described herein, including an absorber spaced apart from a reflector, with the absorber defining a plurality of sub-wavelength openings.

As shown in FIG. 3, a semiconductor sensor, shown as a MEMS bolometer 200, includes an absorber 204 spaced apart from a reflector 208. As described below, the bolometer 200 is configurable to absorb/detect any desired wavelength of radiation.

The absorber 204, which is also referred to herein as an absorber layer, is typically an ultra-thin layer/sheet of platinum having a thickness of approximately ten nanometers (10 nm). In the embodiment, of FIG. 1, the absorber 204 defines a length 216 and a width 220 of approximately fifty micrometers (50 µm). In another embodiment, the absorber 204 is formed from any metal and has any size, shape, and thickness, as desired by those of ordinary skill in the art. The absorber 204 is shown as being generally flat, but in another embodiment the absorber may have any configuration, as desired by those of ordinary skill in the art, including bent, curved, and other nonplanar configurations.

The absorber 204 is spaced apart from the reflector 208 by a distance 212, which is approximately three micrometers (3 µm). The distance 212 is selected based on a desired wavelength of radiation (or range of wavelengths of radiation) to be detected by the bolometer 200. FIG. 3 is not drawn to scale. The distance 212, in the exemplary embodiment, is less than a wavelength (or the shortest wavelength in a range of wavelengths) to be detected by the bolometer 200. The region between the absorber 204 and the reflector 208 is referred to as a cavity 224; accordingly, the distance 212 is also referred to herein as a cavity distance. In another embodiment, the distance 212 is between approximately 0.5 micrometers (0.5 µm) and ten micrometers (10 µm), or any other distance as desired by those of ordinary skill in the art.

The absorber 204 defines a plurality of generally circular openings 220 that extend completely through the absorber 204 (the perspective view of FIG. 3 makes the openings appear slightly elliptical). The absorber 204 of FIG. 3 includes six rows with six of the openings 220 in each row, such that the openings 220 are arranged in a rectangular array. In another embodiment, the absorber 204 defines one hundred of the openings 220 arranged in ten rows of ten openings each. In yet another embodiment, the absorber 204 defines any number of the openings 220, arranged in any configuration, and spaced apart by any distance as desired by those of ordinary skill in the art. Also, the openings 220 may have any shape as desired by those of ordinary skill in the art, such as rectangular, elliptical, and, triangular. The openings 220, in one embodiment, are void of any substance except air. In another embodiment, the openings 220 are at least partially filled with a substance, as desired by those of ordinary skill in the art.

Each opening 220 defines a maximum width 228 of approximately three micrometers (3 µm). Since, the openings 220 are generally circular the maximum width 228 corresponds to the diameter of the openings 220. In the embodiment of FIG. 3, each opening 220 is substantially identical; however, in another embodiment some of the openings have different maximum widths (See FIG. 9). The openings 220 are spaced apart from each other by a distance 232 of approximately two micrometers (2 µm). The maximum width 228 is less than or equal to the distance 212.

The reflector 208, which is also referred to herein as a reflector layer, is typically formed from either platinum or aluminum. As compared to the absorber 204, the reflector 208 is comparatively thick and defines a thickness of approximately five hundred nanometers (500 nm). The reflector 208 is approximately the same size in area as the absorber 104. The reflector 208 is generally imperforate. In another embodiment, the reflector 208 is formed from any material and defines any size and shape, as desired by those of ordinary skill in the art.

A method of making the bolometer 200 includes forming the absorber 204 and the reflector 208. Next, the absorber 204 is spaced apart from the reflector 208 by the distance 212. Then, the openings 220 are formed in the absorber 204, using any process as desired by those of ordinary skill in the art. The openings 220 are sized such that the maximum width 228 is less than the distance 212, thereby making the openings "sub-wavelength" openings. If the openings 220 are to be exposed to radiation exhibiting a range of wavelengths and corresponding frequencies, then the openings 220 are sized so that the maximum width is less than the shortest wavelength of the desired wavelength range.

In operation, the bolometer 200 is exposed to radiation, typically in the infrared region. The radiation is imparted on the reflector 208. At least a portion of the incident radiation is reflected by the reflector 208 onto the absorber 204.

Figure 4:
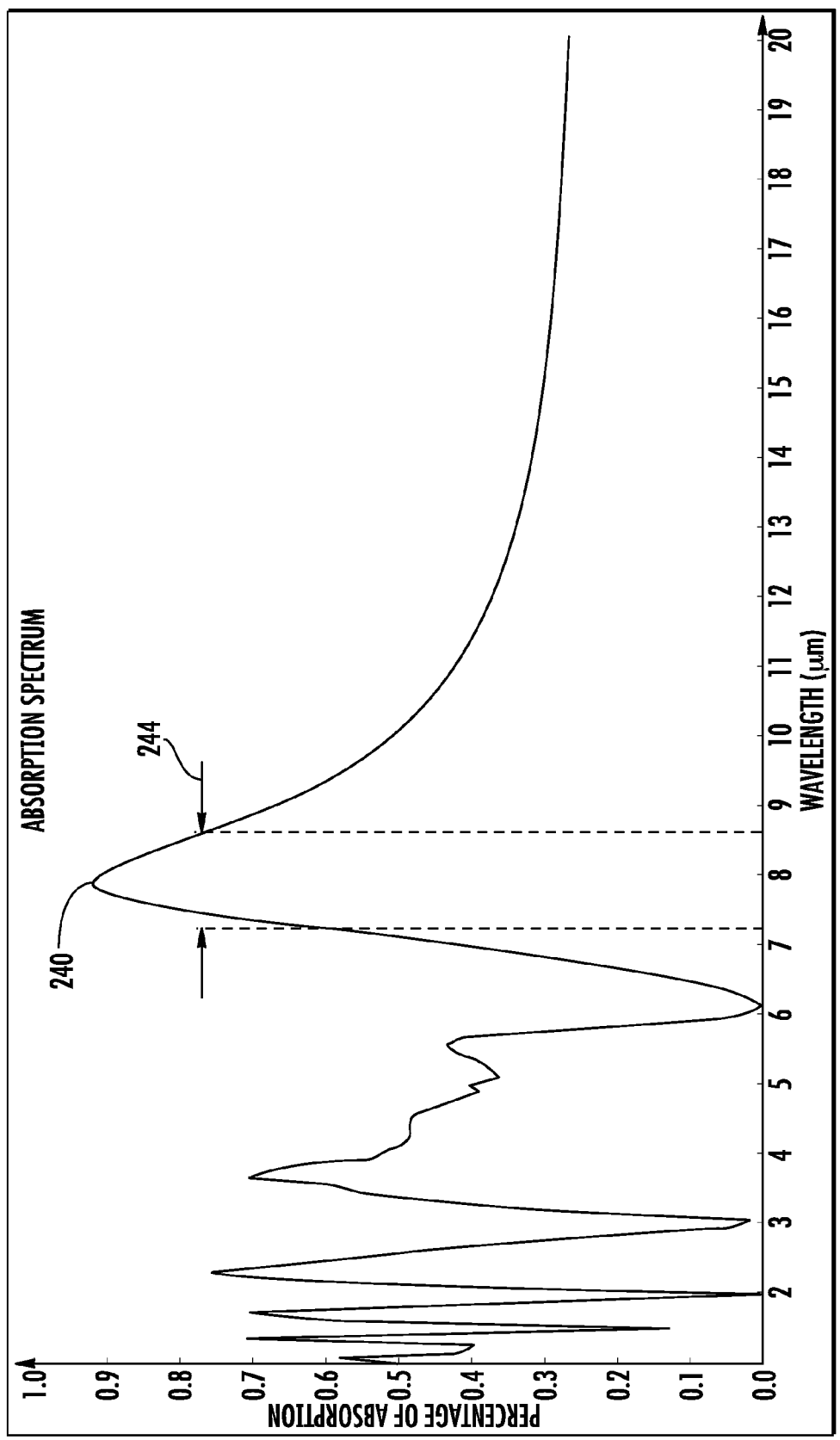
FIG. 4 is a graph showing an absorption spectrum of the semiconductor sensor of FIG. 3.

FIG. 4 illustrates the absorption spectrum of the bolometer 200 in an infrared region of radiation. Considering a range of wavelengths extending from approximately eight micrometers (8 µm) to fourteen micrometers (14 µm), the bolometer 200 absorbs approximately 95% of the radiation at eight micrometers and approximately 35% of the radiation at fourteen micrometers. The absorption percentage declines as the wavelength increases from eight micrometers (8 µm) to fourteen micrometers (14 µm). The bolometer 200 exhibits a maximum absorption percentage 240 of approximately 95% at an optical resonance zone centered at about 8.0 micrometers (8.0 µm). Further, the bolometer 200 exhibits a cavity resonance zone 244 between approximately 7.5 micrometers to 8.5 micrometers.

As compared to the bolometer 100 having an imperforate absorber 104, the bolometer 200 with sub-wavelength openings 220 exhibits a greater maximum absorption percentage 240 (compare 130 of FIG. 2 to 240 of FIG. 4). Additionally, the cavity resonance 244 is wider in the bolometer 200 as compared to the cavity resonance 134 of the bolometer 100. In particular, the width of the cavity resonance 244 and the maximum absorption percentage 240 are increased when the maximum width 228 of the openings 220 is approximately, equal to the distance 212. Furthermore, the graph of FIG. 4 shows that the sub-wavelength openings 220 increase the FWHM (Full Width at Half Maximum) of optical resonance between the absorber 204 and the reflector 208.

As the maximum width 228 of the openings 220 is reduced, the cavity resonance 244 narrows and the maximum absorption percentage 240 decreases. In particular, as the maximum width of the openings 220 is reduced to zero the results converge toward the results achieved with an imperforate absorber 104, as plotted in FIG. 2.

Figure 5:
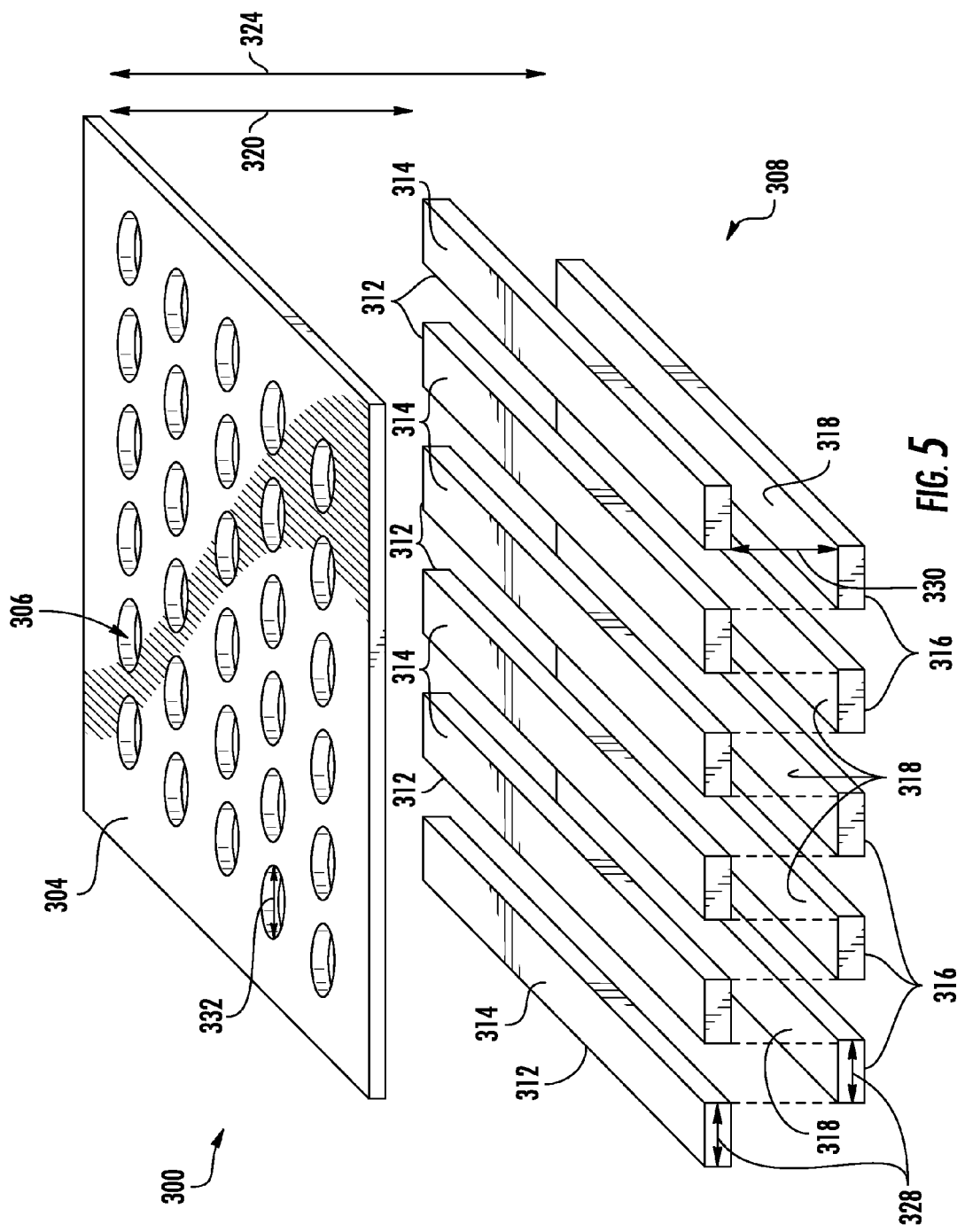
FIG. 5 is a perspective view of another embodiment of a semiconductor sensor, as described herein, including a trenched reflector layer.

As shown in FIG. 5, another embodiment of a MEMS bolometer 300 includes an absorber layer 304 spaced apart from a stepped reflector layer 308. The absorber layer 304 is identical to the absorber layer 204 of FIG. 3, and defines a plurality of openings 306 that are identical to the openings 220.

The reflector layer 308 includes six upper segments 312 and five lower segments 316. The segments 312, 316 are also referred to as reflective components. An upper surface 314 of the segments 312 defines an upper level, and an upper surface 318 of the segments 316 defines a lower level. The segments 312 are interlaced with the segments 316. The segments 312 and the segments 316 define a width 328 of approximately 2.5 micrometers (2.5 µm) and are made of a high-index material. The width 328 is less than a maximum width 332 of the openings in the absorber 304.

The upper surfaces 314 of the upper level are spaced apart from the upper surfaces 318 of the lower level by a distance 330. The distance 330 is approximately five micrometers (5.0 µm). In another embodiment, the reflector layer 308 includes any number of the segments 312, 316, as desired by those of ordinary skill in the art. Additionally, the segments 312, 316 may have any width and the distance 330 is any magnitude as desired by those of ordinary skill in the art. Accordingly, in one embodiment, the segments 312 have a different width than the segments 316. The segments 312, 316, in another embodiment, are formed from any material, as desired by those of ordinary skill in the art.

The upper level of the segments 312 and the lower level of the segments 316 each operate as a high-contrast grating reflector. A low-index material is interposed between the segments 312 and the segments 316 to maintain the position thereof. The segments 312, 316 are formed from platinum, aluminum, or any material as desired by those of ordinary skill in the art.

The absorber layer 304 is spaced apart from the upper level by a distance 320 (a first cavity distance), which is equal to approximately three micrometers (3 µm). The absorber layer 304 is spaced apart from the second level by a distance 324 (a second cavity distance), which is equal to approximately eight micrometers (8 µm).

Figure 6:
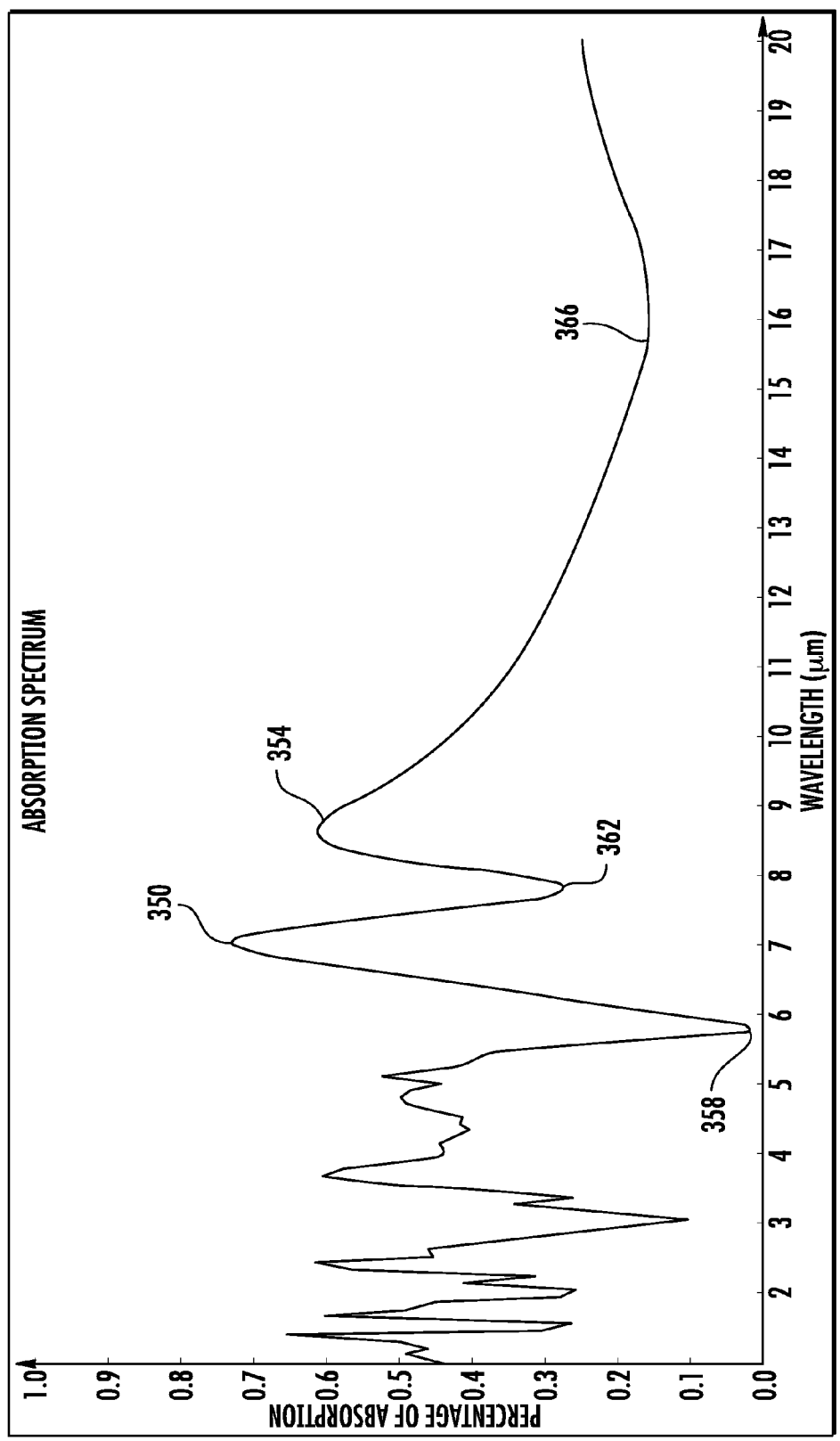
FIG. 6 is a graph showing an absorption spectrum of the semiconductor sensor of FIG. 5.

FIG. 6 illustrates an absorption spectrum of the bolometer 300 in the infrared region of radiation. Considering a range of wavelengths extending from approximately six micrometers (6 µm) to fourteen micrometers (14 µm), the bolometer 300 exhibits a first optical resonance zone 350, a second optical resonance zone 354, and three destructive interference zones 358, 362, 366. The bolometer 300 exhibits two resonance zones 350, 354 due to the stepped reflector 308 defining two surfaces (i.e. the upper surface and the lower surface). At the first optical resonance zone 350, the bolometer 300 absorbs approximately 75% of the radiation at approximately seven micrometers (7.0 µm). At the second optical resonance zone 354 the bolometer absorbs approximately 60% of the radiation at approximately 8.5 micrometers. The absorption percentage forms a trough between the optical resonance zones 350, 354, which is one of the destructive interference zones 362. As the wavelength of the radiation increases from approximately nine micrometers (9 µm) to fourteen micrometers (16 µm) the absorption percentage gradually decreases. Both segments 312, 316 work simultaneously to reflect the radiation and to form the absorption spectrum.

The wavelengths at which the destructive interference zones 358, 362, 366 occur are at least partially based on the distances 320, 324. In particular, the destructive interference zone 358 is based on the distance 320 and occurs at half of the incident wavelength (212). Thus, in the illustrated example, the destructive interference zone 358 affects radiation having a wavelength of approximately six micrometers (6 µm). The destructive interference zone 362 is based on the distance 324 and occurs at the full value of the incident wavelength (λ). Thus, in the illustrated example, the destructive interference zone 362 affects radiation having a wavelength of approximately six micrometers (6 µm). The destructive interference zone 366 is based on the distance 324 and occurs at half of the incident wavelength (212). Thus, in the illustrated example, the destructive interference zone 366 affects radiation having a wavelength of approximately sixteen micrometers (16 µm).

The reflector 308 having two layers achieves a filer-like response in the absorption spectrum that is dependent on the distance 320 and the distance 324, among other factors.

In another embodiment, the segments 312, 316 are formed from five hundred nanometer thick "bars" of silicon arranged in the high contrast grating configuration of FIG. 5. In this embodiment, the absorption response shows a filter-like response that is similar to the absorption spectrum shown in FIG. 6.

In yet another embodiment, the segments 312, 316 are formed from five hundred nanometer thick "bars" of silicon arranged in the high contrast grating configuration of FIG. 5. The segments 312, 316 are supported by a trenched structure 410 (see FIG. 7) formed from silicon dioxide.

In a further embodiment, the segments 312, 316 and the trenched structure 410 are integrally formed from silicon and are arranged in the high contrast grating configuration of FIG. 5.

In another embodiment, the segments 312, 316 and the trenched structure 410 are integrally formed from aluminum and are arranged in the high contrast grating configuration of FIG. 5.

Figure 7:
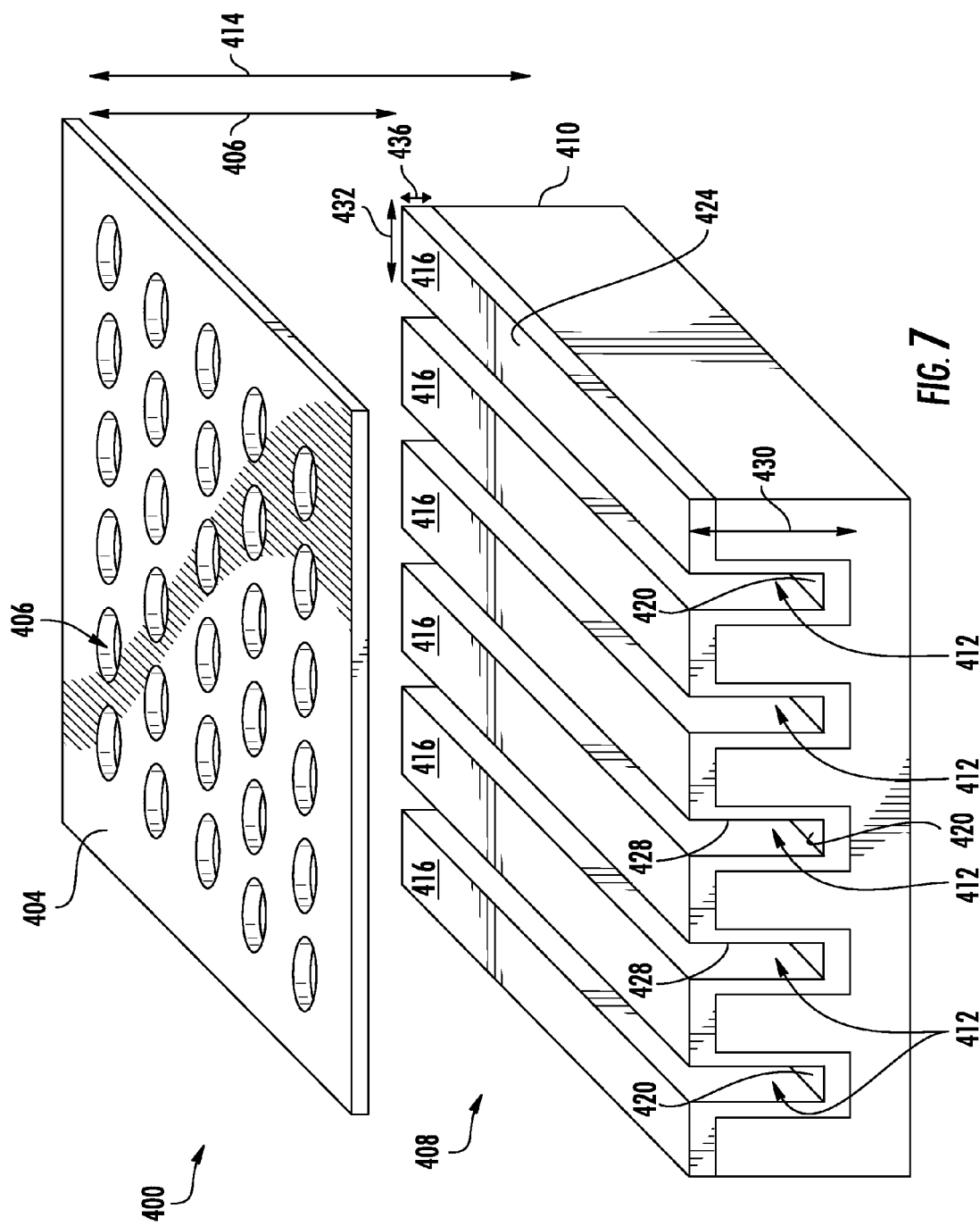
FIG. 7 is a perspective view of another embodiment of a semiconductor sensor, as described herein, including a trenched reflector layer that is sputter coated with a layer of aluminum.

As shown in FIG. 7, another embodiment of a MEMS bolometer 400 includes an absorber layer 404 spaced apart from a stepped reflector layer 408. The absorber layer 404 is identical to the absorber layer 204 of FIG. 3, and defines a plurality of openings 406 that are identical to the openings 220.

The reflector 408 includes a substrate referred to as a trenched structure 410 and a layer of material 424 deposited thereon. The trenched structure 410 defines five trenches 412, which are generally parallel to each other. The trenched structure 410 is formed from silicon. In another embodiment, the trenched structure 410 is formed form silicon dioxide, aluminum, or any other material as desired by those of ordinary skill in the art. Also in another embodiment, the trenched structure 410 defines any desired number of trenches 412 of any shape or configuration.

The material 424 is a metal layer that is deposited onto the trenched structure 410 by sputtering or by any deposition process desired by those of ordinary skill in the art. The material 424 is aluminum, platinum, or any other metal as desired by those of ordinary skill in the art. The material defines six upper surfaces 416, five lower surfaces 420, and a plurality of vertical surfaces 428. The upper surfaces 416 define an upper level, and the lower surfaces 420 define a lower level. The upper surfaces 416 define a width 432 of approximately 2.5 micrometers (2.5 μm) wide. The lower surfaces 420 are slightly narrower. The upper surfaces 416 are spaced apart from the absorber 204 by the distance 406, which is approximately three micrometers (3 μm). The lower surfaces 420 are spaced apart from the absorber 204 by the distance 414, which is approximately six micrometers (6 μm). The upper surfaces 416 are spaced apart from the lower surfaces 420 by a distance 430. The distance 430 is approximately five micrometers (5 μm). The vertical surfaces 428 connect the upper surfaces 416 to the lower surfaces 420. The material 424 as a thickness 436 of approximately five hundred nanometers (500 nm), such that the material 424 is thicker than the skin depth of the radiation on the material 424. So long as the material 424 is thicker than the skin depth of the radiation, the composition of the trenched structure 410 is immaterial.

Figure 8:
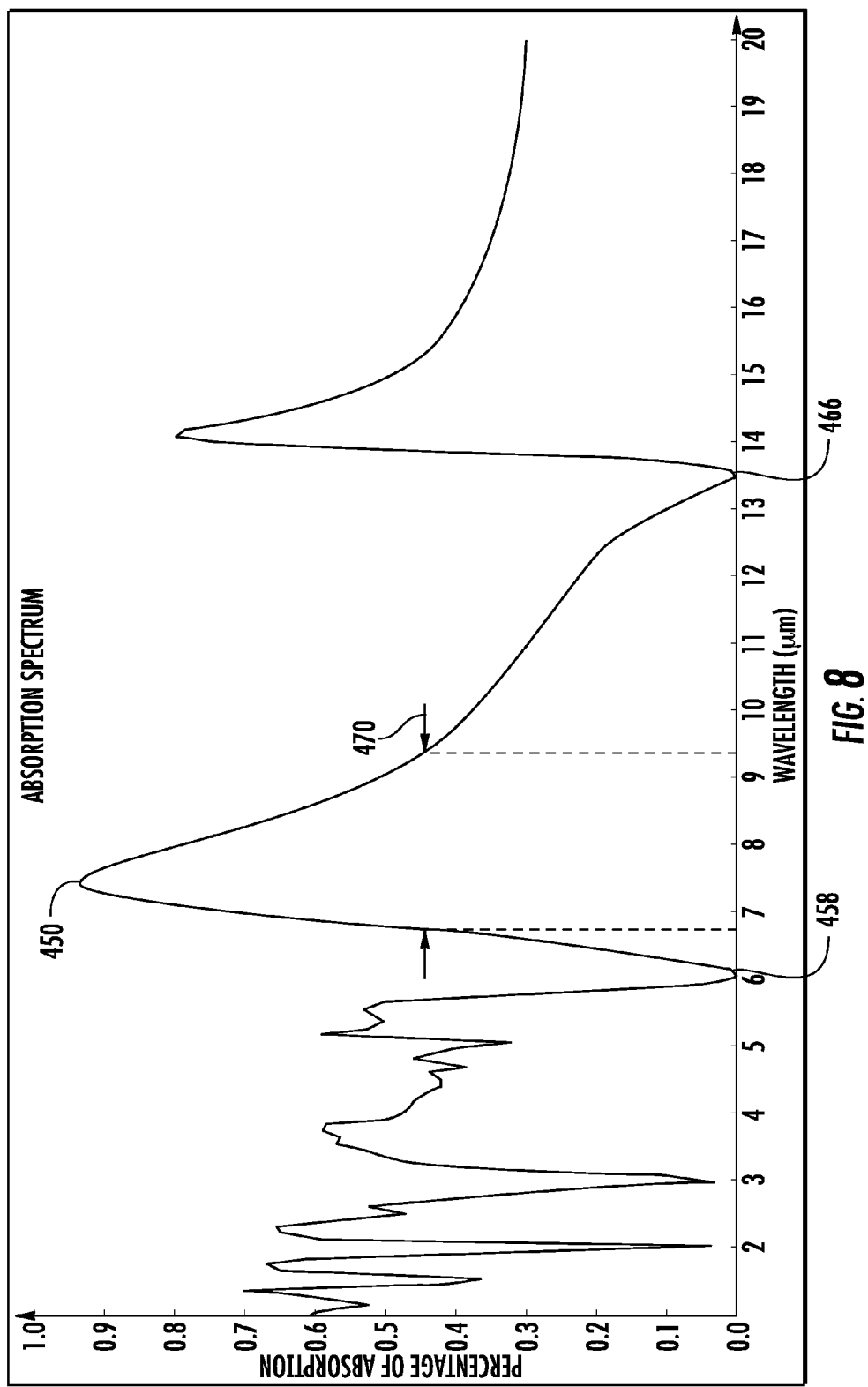
FIG. 8 is a graph showing an absorption spectrum of the semiconductor sensor of FIG. 7.

FIG. 8 illustrates the absorption spectrum of the bolometer 400 in the infrared region of radiation. Considering a range of wavelengths extending from approximately six micrometers (6 μm) to fourteen micrometers (14 μm), the bolometer 400 exhibits an optical resonance point 450, two destructive interference points 458, 466, and a pass band 470. Due to the distances 406, 414 the bolometer 400 exhibits a blended optical resonance zone 450 even though the reflector 408 is stepped. At the center of the optical resonance zone 450, the bolometer 400 absorbs approximately 95% of the radiation at approximately 7.5 micrometers (7.5 μm).

FIG. 8 also shows that the absorption response at the destructive interference zone 458 has been brought down to approximately 0% absorption, as compared to the destructive interference zone 358 of FIG. 6. Similarly, the absorption at the destructive interference zone 466 has been brought down to approximately 0% absorption, as compared to the destructive interference zone 366 of FIG. 6. The reduction in absorption at the 212 destructive interference zones 458, 466 is due to the material 424 and the distances 406, 410, among other factors.

The pass band 470 exhibits a peak absorption at the optical resonance point 450 and tapers down at the boundaries thereof.

Figure 9:
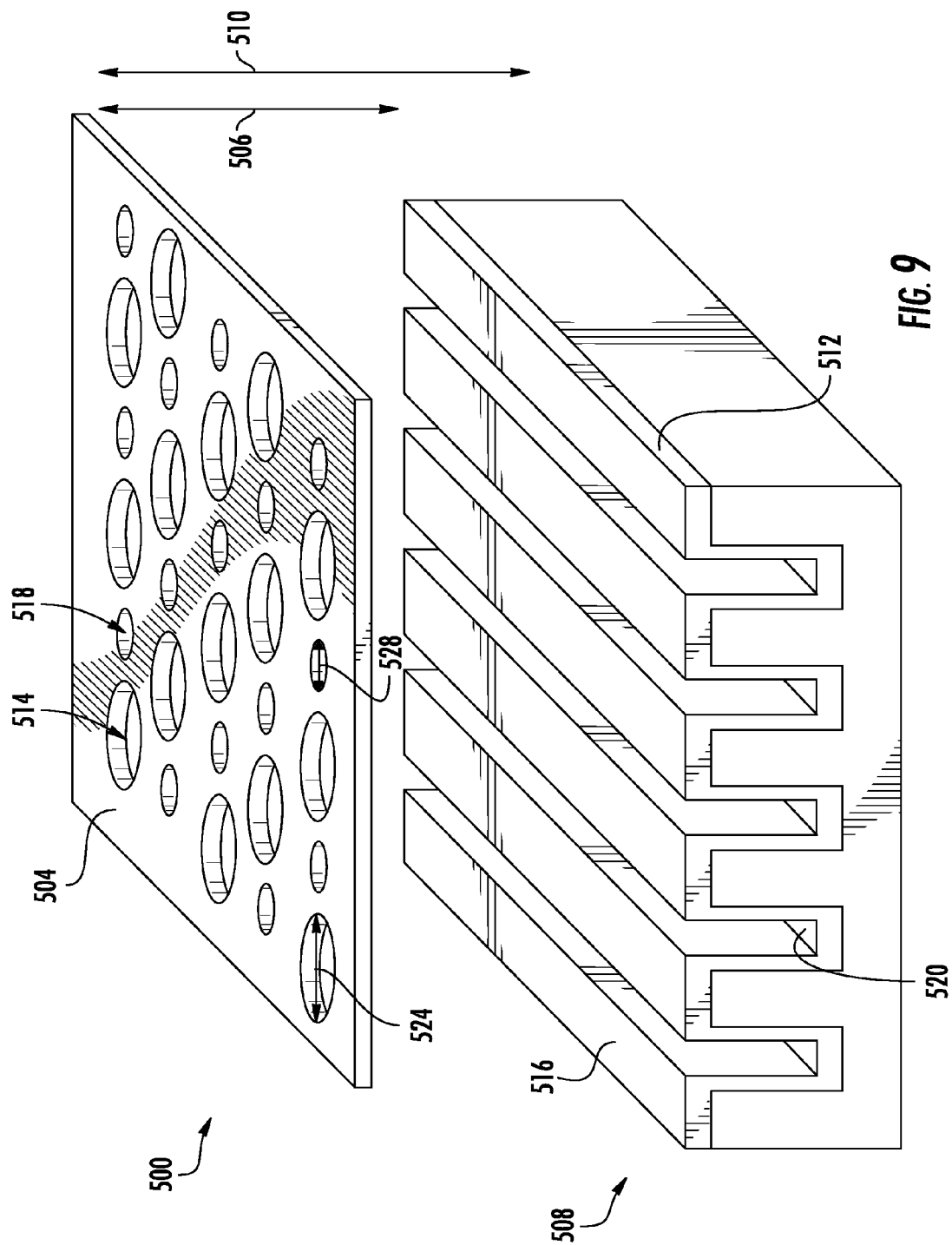
FIG. 9 is a perspective view of another embodiment of a semiconductor sensor, as described herein, including a trenched reflector layer that is sputter coated with a layer of aluminum and an absorber layer that defines opening having different maximum widths.

As shown in FIG. 9, a MEMS bolometer 500 includes an absorber 504 and a stepped reflector 508. The reflector 508 is identical to the reflector 408 of FIG. 7. The reflector 508 includes a material 512 that is identical to the material 424 and defines a plurality of upper surfaces 516 and a plurality of lower surfaces 520. The upper surfaces 516 are identical to the upper surfaces 416, and the lower surfaces 520 are identical to the lower surfaces 420.

The absorber 504 is spaced apart from the upper surfaces 516 by a distance 506, which is approximately three micrometers (3 μm). The absorber 504 is spaced apart from the lower surfaces 520 by a distance 510, which is approximately six micrometers (6 μm).

The absorber 504 defines a plurality of openings 514, 518 that extend completely through the absorber 504. The openings 514 are generally circular (the perspective view of FIG. 9 makes the openings appear slightly elliptical). Each opening 514 defines a maximum width 524 of approximately four micrometers (4 μm). The openings 518 are also generally circular. Each opening 518 defines a maximum width 528 of approximately two micrometers (2 μm). Since, the openings 514, 518 are generally circular the maximum widths 524, 528 correspond to the diameters of the openings 514, 518. The maximum width 524 is less than or equal to the distance 510, and the maximum width 528 is less than or equal to the distance 506.

Figure 10:
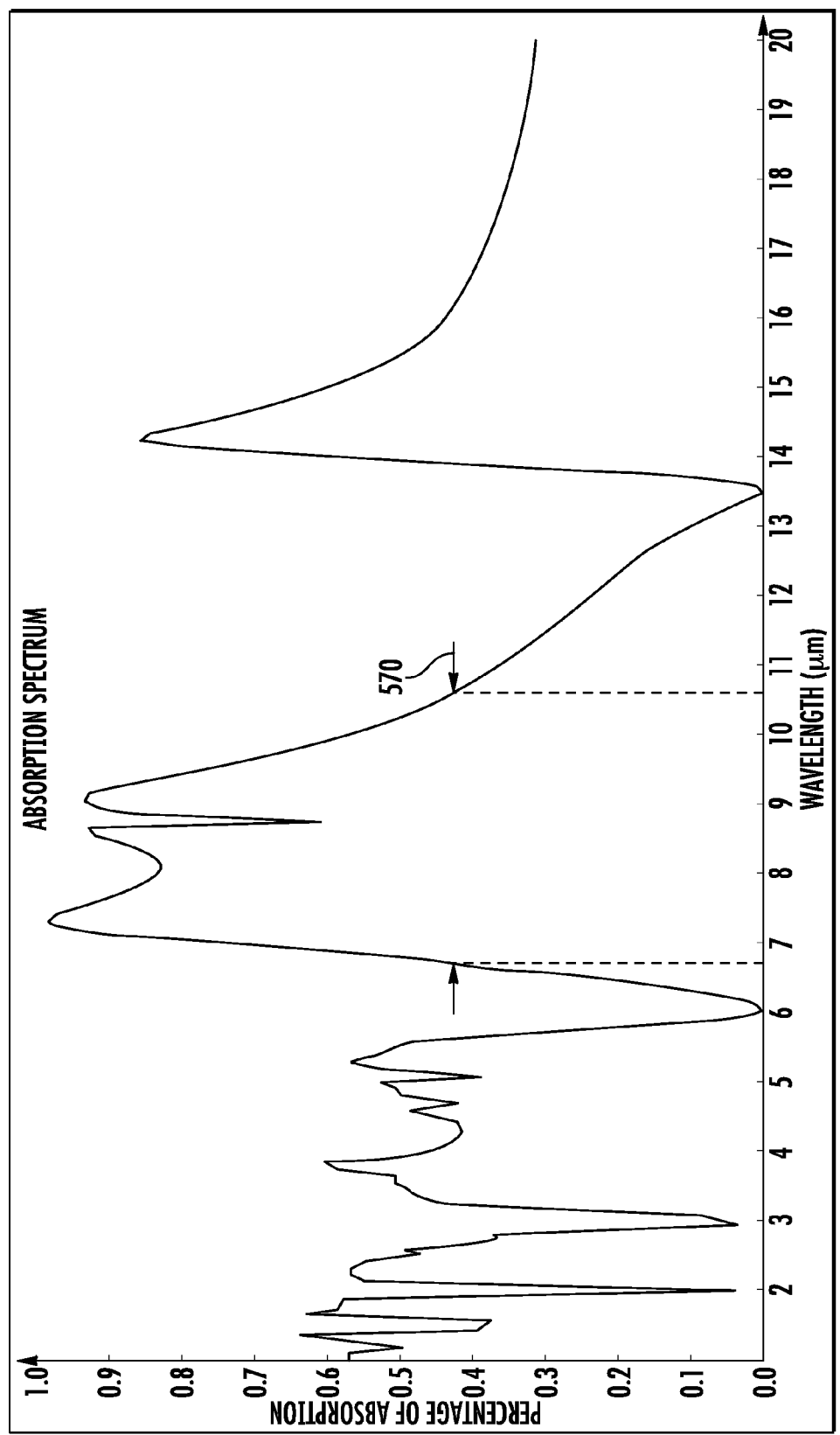
FIG. 10 is a graph showing an absorption spectrum of the semiconductor sensor of FIG. 9.

FIG. 10 shows an absorption spectrum of the bolometer 500 of FIG. 9. As shown, mixing sub-wavelength openings 514, 518 of different maximum widths 524, 528 with the stepped reflector 508 having the material 512 widens a pass band 570 of the response as compared to the pass band of 450 shown in FIG. 8.

Figure 11:
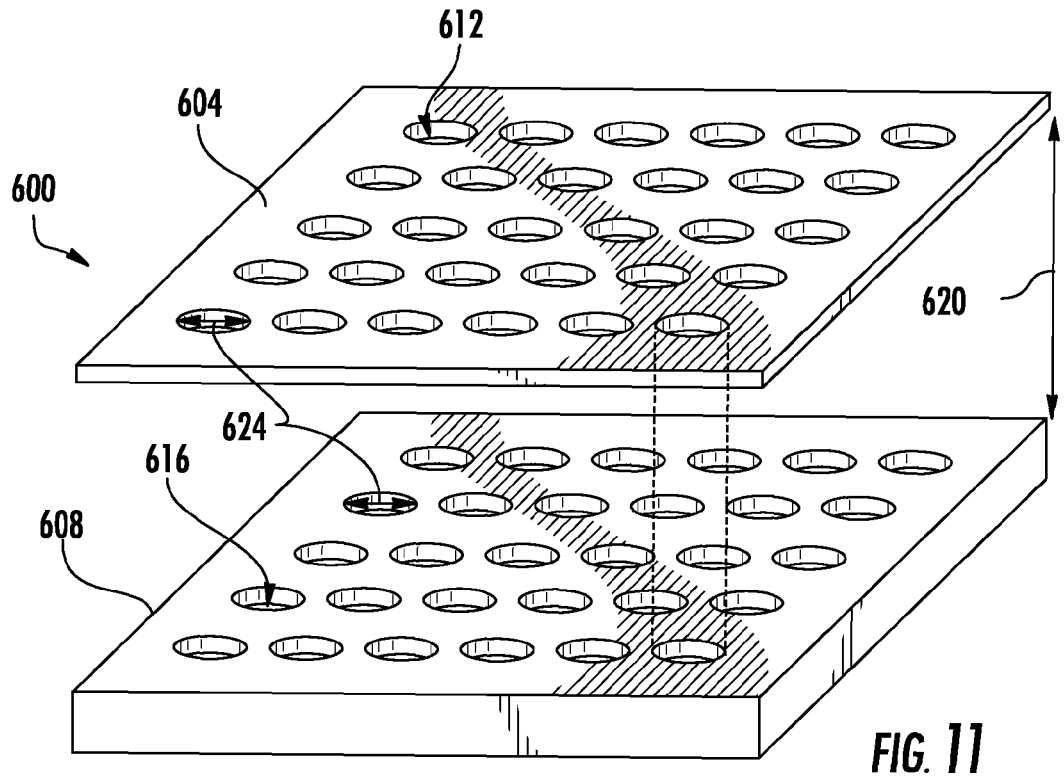
FIG. 11 is a perspective view of another embodiment of a semiconductor sensor, as described herein, including an absorber defining a plurality of sub-wavelength openings and a reflector defining a plurality of sub-wavelength openings.

FIG. 11 shows another embodiment of a bolometer 600 that includes an absorber 604 and a reflector 608. The absorber 604 defines a plurality of openings 612 therethrough. The reflector 608 also defines a plurality of openings 616 therethrough. The absorber 604 is spaced apart from the reflector 608 by a distance 620. The openings 612 are aligned with the openings 616. The openings 616 serve to widen the cavity resonance of an absorption response (not shown) of the bolometer 600. The openings 612, 616 define a maximum width 624 that is less than the distance 620. FIG. 11 is not drawn to scale.

Figure 12:
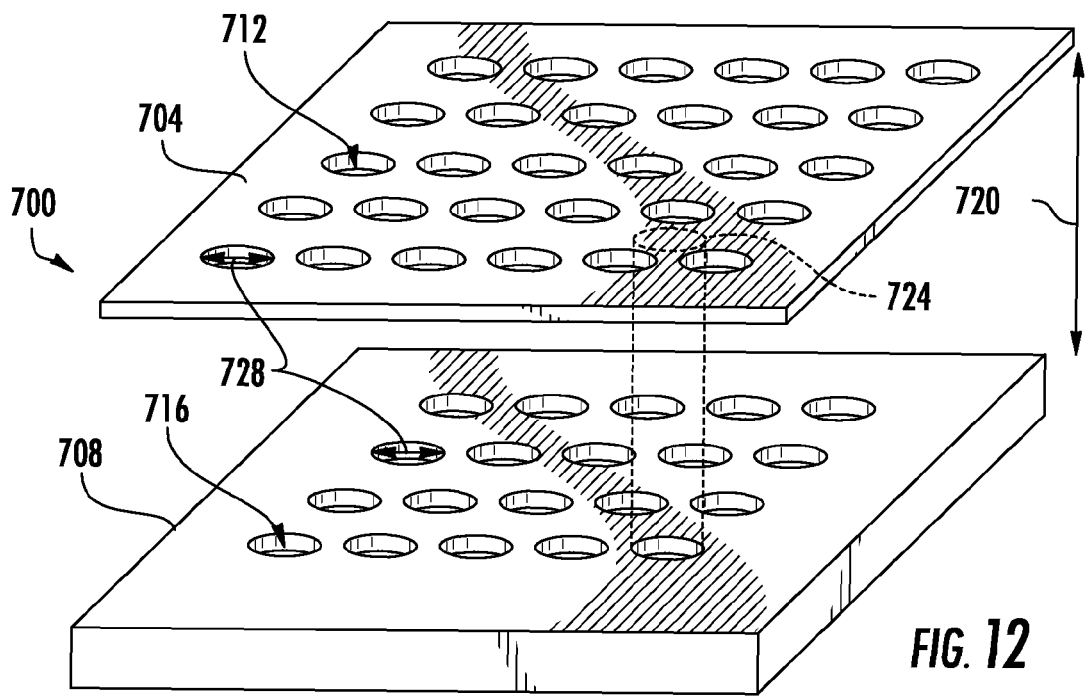
FIG. 12 is a perspective view of yet another embodiment of a semiconductor sensor, as described herein, including an absorber defining a plurality of sub-wavelength openings and a reflector defining a plurality of sub-wavelength openings.

FIG. 12 shows another embodiment of a bolometer 700 that includes an absorber 704 and a reflector 708. The absorber 704 defines a plurality of openings 712 therethrough. The reflector 708 also defines a plurality of openings 716 therethrough. The absorber 704 is spaced apart from the reflector 708 by a distance 720. The openings 712 are misaligned with the openings 716 as shown by the position 724 (shown in phantom) of the one of the openings 716 on the absorber 704. The openings 716 serve to widen the cavity resonance of the absorption response of the bolometer 700. The openings 712, 716 define a maximum width 728 that is less than the distance 720. FIG. 12 is not drawn to scale.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A semiconductor sensor comprising:
   a substrate including a first plurality of reflective components and a second plurality of reflective components; and
   an absorber spaced apart from the first plurality of reflective components by a first distance and spaced apart from the second plurality of reflective components by a second distance, the absorber defining a plurality of openings each having a maximum width that is less than or equal to the first distance and the second distance.

2. The semiconductor sensor as claimed in claim 1, wherein:
   the first plurality of reflective components and the second plurality of reflective components are configured to reflect radiation, and
   at least one of the first distance and the second distance is less than a wavelength of the radiation.

3. The semiconductor sensor as claimed in claim 2, further comprising:

a metal layer formed on at least one of the first plurality of reflective components and the second plurality of reflective components, the metal layer defining a thickness, wherein the substrate is formed from silicon oxide, and wherein the thickness is greater than a skin depth of the radiation on the at least one of the first plurality of reflective components and the second plurality of reflective components.

4. The semiconductor sensor as claimed in claim 1, wherein the reflective components of the first plurality of reflective components are interlaced with the reflective components of the second plurality of reflective components.

5. The semiconductor sensor as claimed in claim 4, wherein:

the first plurality of reflective components define a first reflector width, the second plurality of reflective components define a second reflector width, and the first reflector width and the second reflector width are less than the maximum width.

6. The semiconductor sensor as claimed in claim 1, further comprising:

a metal layer sputter deposited on at least one of the first plurality of reflective components and the second plurality of reflective components.

7. The semiconductor sensor as claimed in claim 1, wherein:

the plurality of openings includes a plurality of first openings having a first maximum opening width and a plurality of second openings having a second maximum opening width, and the first maximum opening width is different than the second maximum opening width.

8. The semiconductor sensor as claimed in claim 7, wherein:

the openings of the plurality of first openings are generally circular, and the openings of the plurality of second openings are generally circular.

9. The semiconductor sensor as claimed in claim 1, wherein:

the openings of the plurality of openings are circular and a define a diameter, and the diameter is equal to the maximum opening width.

10. The semiconductor sensor as claimed in claim 1, wherein the openings of the plurality of openings are formed in a rectangular array.

11. A method of forming a semiconductor sensor comprising:

spacing an absorber apart from at least one reflective component by a distance;

forming a plurality of openings in the absorber, each opening of the plurality of openings defining a maximum width that is less than the distance; and depositing a metal layer on the at least one reflective component, the metal layer defining a thickness, wherein the distance is based on a wavelength of radiation, wherein the distance is less than the wavelength of radiation, and wherein the thickness is greater than a skin depth of the radiation on the at least one reflective component.

12. The method as claimed in claim 11, wherein the at least one reflective component includes a first plurality of reflective components and a second plurality of reflective components, and the method further comprises:

spacing the absorber apart from the first plurality of reflective components by a first distance; and spacing the absorber apart from the second plurality of reflective components by a second distance, wherein the first distance and the second distance are based on the wavelength of radiation, and wherein the first distance and the second distance are less than the wavelength of radiation.

13. The method as claimed in claim 12, wherein the reflective components of the first plurality of reflective components are interlaced with the reflective components of the second plurality of reflective components.

14. The method as claimed in claim 13, wherein:

the reflective components of the first plurality of reflective components define a first reflector width, the reflective components of the second plurality of reflective components define a second reflector width, and the first reflector width and the second reflector width are less than the maximum width.

15. The method as claimed in claim 11, wherein:

the plurality of openings includes a plurality of first openings having a first opening width and a plurality of second openings having a second opening width, and first opening width is different than the second opening width.

16. The method as claimed in claim 15, wherein:

the openings of the plurality of first openings are circular, and the openings of the plurality of second openings are circular.

17. The method as claimed in claim 11, wherein:

the openings of the plurality of openings are circular and a define a diameter, and the diameter is equal to the maximum opening width.

18. The method as claimed in claim 17, wherein the openings of the plurality of openings form a rectangular array.

19. A semiconductor sensor comprising:

a substrate including at least one reflective component;

an absorber spaced apart from the at least one reflective component by a distance, the absorber defining a plurality of openings each having a maximum width that is less than or equal to the distance; and a metal layer formed on the at least one reflective component and defining a thickness, wherein the at least one reflective component is configured to reflect radiation, wherein the distance is less than a wavelength of the radiation, wherein the substrate is formed from silicon oxide, and wherein the thickness is greater than a skin depth of the radiation on the at least one reflective component.

20. The semiconductor sensor as claimed in claim 19, wherein:

the plurality of openings includes a plurality of first openings having a first maximum opening width and a plurality of second openings having a second maximum opening width, and the first maximum opening width is different than the second maximum opening width.

* * * * *